United States Patent
Miller

(10) Patent No.: US 9,102,026 B2
(45) Date of Patent: Aug. 11, 2015

(54) THROUGH HOLE DEPTH MEASUREMENT METHOD AND DEVICE

(75) Inventor: Russell L. Miller, Fort Worth, TX (US)

(73) Assignee: Lockheed Martin Corporation, Bethesda, MD (US)

(*) Notice: Subject to any disclaimer, the term of this patent is extended or adjusted under 35 U.S.C. 154(b) by 843 days.

(21) Appl. No.: 13/182,114

(22) Filed: Jul. 13, 2011

(65) Prior Publication Data

US 2013/0017027 A1 Jan. 17, 2013

(51) Int. Cl.
*B23Q 17/09* (2006.01)
*B23Q 17/22* (2006.01)
B23Q 15/013 (2006.01)
B23B 49/00 (2006.01)
B23Q 15/007 (2006.01)

(52) U.S. Cl.
CPC ............ *B23Q 17/0966* (2013.01); *B23Q 17/22* (2013.01); *B23B 49/00* (2013.01); *B23Q 15/007* (2013.01); *B23Q 15/013* (2013.01); *B23Q 17/09* (2013.01); *Y10T 408/03* (2015.01); *Y10T 408/16* (2015.01); *Y10T 408/17* (2015.01); *Y10T 408/172* (2015.01); *Y10T 408/175* (2015.01); *Y10T 408/21* (2015.01); *Y10T 408/5623* (2015.01); *Y10T 408/56245* (2015.01); *Y10T 408/57* (2015.01)

(58) Field of Classification Search
CPC .... B23B 49/00; B23Q 15/007; B23Q 15/013; B23Q 17/09; B23Q 17/0952; B23Q 17/0966
USPC ................. 408/8, 10, 11, 13, 95, 97
See application file for complete search history.

(56) References Cited

U.S. PATENT DOCUMENTS

| | | | |
|---|---|---|---|
| 4,688,970 A | 8/1987 | Eckman | |
| 4,717,291 A * | 1/1988 | Zafir | 408/13 |
| 4,753,555 A | 6/1988 | Thompson et al. | |
| 5,308,198 A * | 5/1994 | Pumphrey | 408/1 R |
| 5,535,498 A | 7/1996 | Roberts et al. | |
| 6,665,948 B1 * | 12/2003 | Kozin et al. | 33/833 |
| 6,979,288 B2 | 12/2005 | Hazlehurst et al. | |
| 2009/0129877 A1 | 5/2009 | Brady | |
| 2009/0245956 A1 * | 10/2009 | Apkarian et al. | 408/1 R |
| 2011/0020084 A1 * | 1/2011 | Brett et al. | 408/1 R |

FOREIGN PATENT DOCUMENTS

| | | |
|---|---|---|
| WO | 2004106847 A1 | 12/2004 |
| WO | 2007148114 A1 | 12/2007 |

OTHER PUBLICATIONS

Jose Luis Olazagoitia, New PKM Tricept T9000 and its Application to Flexible Manufacturing at Aerospace Industry, SAE International, 2007, 11 pages.
Lutz Neugenbauer, Getting Robots to Multi-Task, Aerospace Engineering, Mar. 2007, 3 pages.

* cited by examiner

*Primary Examiner* — Daniel Howell
*Assistant Examiner* — Chwen-Wei Su
(74) *Attorney, Agent, or Firm* — Reising Ethington P.C.

(57) ABSTRACT

A through-hole depth measurement device includes a cutting force sensor configured and mountable in a position to sense cutting force exerted by a drill bit of a drill against a workpiece or stack of workpieces. A controller is coupled to the force sensor, is coupleable to a workpiece surface position sensor, and is configured to record the through-hole depth of the workpiece or stack of workpieces in response to signals received from the workpiece surface position sensor when the drill bit reaches a drill bit exit point. The cutting force sensor is configured and positionable to sense cutting force transmitted between a drill spindle and a spindle housing.

14 Claims, 6 Drawing Sheets

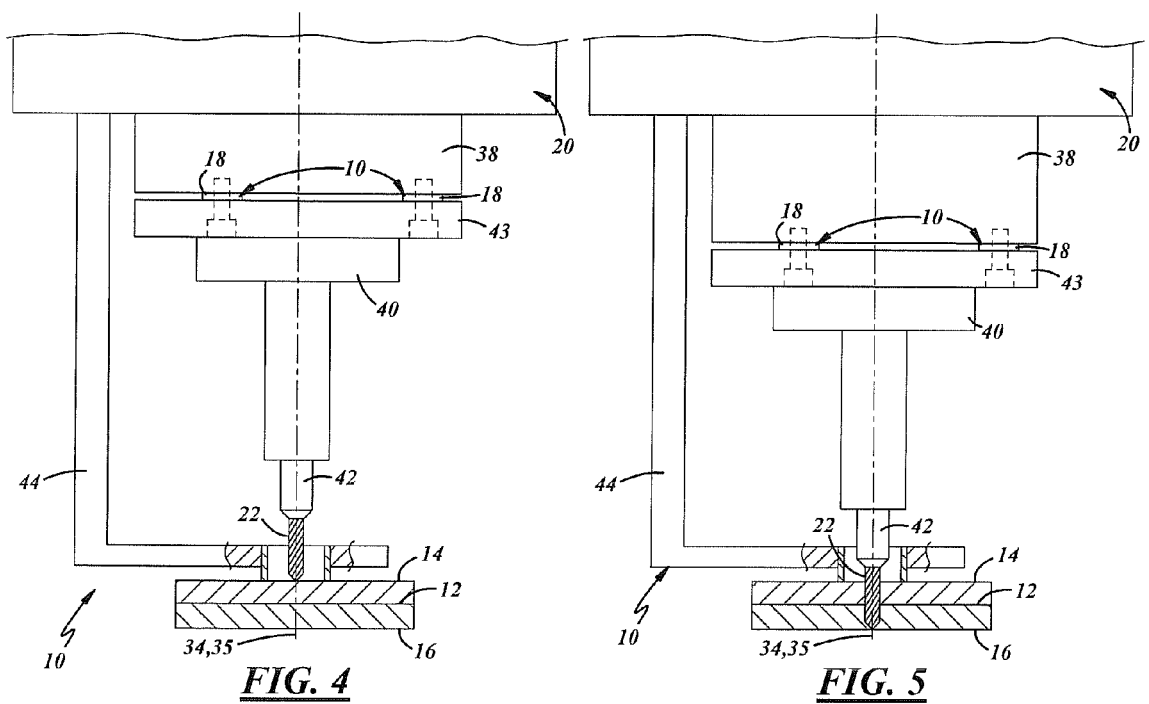

THROUGH HOLE DEPTH MEASUREMENT METHOD AND DEVICE

CROSS-REFERENCES TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of the Invention

This invention relates generally to a method and device for measuring the depth of a through-hole formed through one or more workpieces.

2. Description of the Related Art Including Information Disclosed Under 37 CFR 1.97 and 1.98

The thickness of sheet material such as composite fiber reinforced plastic (CFRP) can vary from nominal engineering values. Consequently, stack-up thicknesses of multiple sheets of such material and, thus, the depth of fastener holes drilled through a stack of such material varies sufficiently that fastener selection can require that individual hole depth measurements be made. It is, therefore, advantageous to be able to quickly and accurately measure the depths of holes that have been formed through sheet material stacks so that respective fasteners of appropriate grip length can be selected for use in the holes. It's also advantageous to be able to determine such hole depths and corresponding fastener grip lengths in advance of fastener selection and installation, and without having to execute a separate measurement step following the drilling of each hole. Accurate individual hole depth measurements can also allow a fastener bill of materials (BOM) to be prepared based on actual rather than nominal hole depths, which would allow fasteners to be delivered and kilted in advance and delivered in proper quantities to an assembly station. However, known through-hole depth measurement methods and devices are unable to sense changes in drill force in a drill that comprises a pressure foot system—such as one driven by an air cylinder—that's configured to exert a constant pressure against the facing surface of a workpiece.

BRIEF SUMMARY OF THE DISCLOSURE

A through-hole depth measurement device is provided for measuring the depth of a through-hole formed through one or more workpieces. The device may include a cutting force sensor configured and mountable in a position to sense cutting force exerted by a drill bit of a drill against a workpiece or stack of workpieces. A controller is coupled to the force sensor, is coupleable to a workpiece surface position sensor, and is configured to record a through-hole depth of a workpiece or stack of workpieces in response to signals received from the workpiece surface position sensor when the drill bit reaches a drill bit exit point. The device may also include a cutting force sensor configured and positionable to sense cutting force transmitted between a drill spindle and a spindle housing. This would allow the device to sense changes in drill force in a drill that comprises a pressure foot system, such as one driven by an air cylinder, that's configured to exert a constant pressure against the facing surface of a workpiece.

The cutting force sensor may be configured to sense axial cutting force transmitted between the drill spindle and the spindle housing. It may also be positioned in direct axial alignment with the direction of drill force application. When axially-aligned in this way, the cutting force sensor is advantageously positioned to sense axial cutting force exerted by a drill bit of a drill against a workpiece.

The cutting force sensor may include a plurality of axial cutting force sensor units. The sensor units may be mounted in respective spaced-apart positions between the spindle housing and a flange engagement plate that transmits axial cutting force from the spindle to the spindle housing The controller may be configured to record through-hole depth as being the difference between a workpiece near-side surface position and a workpiece far-side surface position when the controller receives a decaying force signal from the force sensor indicative of drill bit breakout.

The workpiece surface position sensor may include a workpiece near-side surface position sensor and a workpiece far-side surface position sensor. The controller may be configured to record through-hole depth as being the difference between a workpiece near-side surface position indicated by the near-side position sensor and a workpiece far-side surface position indicated by the far-side position sensor when the controller receives a decaying force signal from the force sensor indicative of drill bit breakout.

The workpiece near-side surface position sensor may comprise a pressure foot axis position sensor, and the workpiece far-side surface position sensor may comprise a spindle feed axis position sensor. The controller may be configured to record through-hole depth as being the difference between a workpiece near-side surface position indicated by the pressure foot axis position sensor, and a workpiece far-side surface position indicated by the spindle feed axis position sensor when the controller receives a decaying force signal from the force sensor indicative of drill bit breakout.

The controller may be configured to determine, during a gradual and nonlinear reduction in force experienced as a drill bit exits the far-side surface of a workpiece or stack of workpieces, the point at which the distal end of a drill bit has actually breached a far side of a workpiece or stack of workpieces. The controller may also be configured to distinguish between decaying force signals associated with drill bit breakout and decaying force signals associated with peck cycles. The controller may be configured to determine peckless cutting force signals by identifying and removing peck cycle forces from cutting force readings.

Also, a method is provided for measuring the depth of a through-hole formed through one or more workpieces. According to this method, one can measure the depth of such a through-hole by first positioning a drill spindle and attached drill bit of a drill in axial alignment with a desired hole location adjacent a work piece or stack of workpieces, rotating and advancing the drill spindle axially, causing the bit to cut into the workpiece or stack of workpieces, and monitoring cutting force and workpiece surface position sensor readings until decaying cutting force signals indicative of drill bit breakout are detected. Workpiece near-side surface position and workpiece far-side position may be then be determined by polling workpiece surface position sensor readings at the instance of breakout. Hole depth may then be calculated as being the axial distance between the workpiece near-side surface position and the workpiece far-side surface position. Finally, the drill may be polled for coordinates identifying hole location in the workpiece or workpiece stack and the measured hole depth may be recorded and associated with the hole location.

The detection of a decaying cutting force signal indicative of drill bit breakout may include processing the breakout signal to determine the precise instance of breakout. Detection of a decaying cutting force signal may also include determining a peckless cutting force signal by detecting and removing peck cycle forces from cutting force readings. In other words, the detection of a decaying cutting force signal may include the reconstructing of a signal that may include interruptions from peck cycles, and doing so by removing these cycles from the signal, resulting in a signal having a profile similar to one without peck cycles.

The step of determining workpiece near-side surface position and workpiece far-side position may include determining workpiece near-side surface position from pressure foot position along a pressure foot axis and determining workpiece far-side position from drill spindle position along the spindle feed axis. This may be done by polling pressure foot axis and spindle feed axis position sensor readings at the instance of breakout.

BRIEF DESCRIPTION OF THE SEVERAL VIEWS OF THE DRAWINGS

These and other features and advantages will become apparent to those skilled in the art in connection with the following detailed description and drawings of one or more embodiments of the invention, in which:

FIG. 4 is a schematic partial cross-sectional front view of the autodrill and workpiece stack of FIG. 1 with both the pressure foot and the drill bit shown engaged against the near-side surface of the workpiece stack;

FIG. 5 is a schematic partial cross-sectional front view of the autodrill and workpiece stack of FIG. 1 with the pressure foot shown engaged against the near-side surface of the workpiece stack and the drill bit shown embedded in the workpiece stack with a tip of the drill bit at a far-side surface of the workpiece stack;

DETAILED DESCRIPTION OF INVENTION EMBODIMENT(S)

Figure 1:
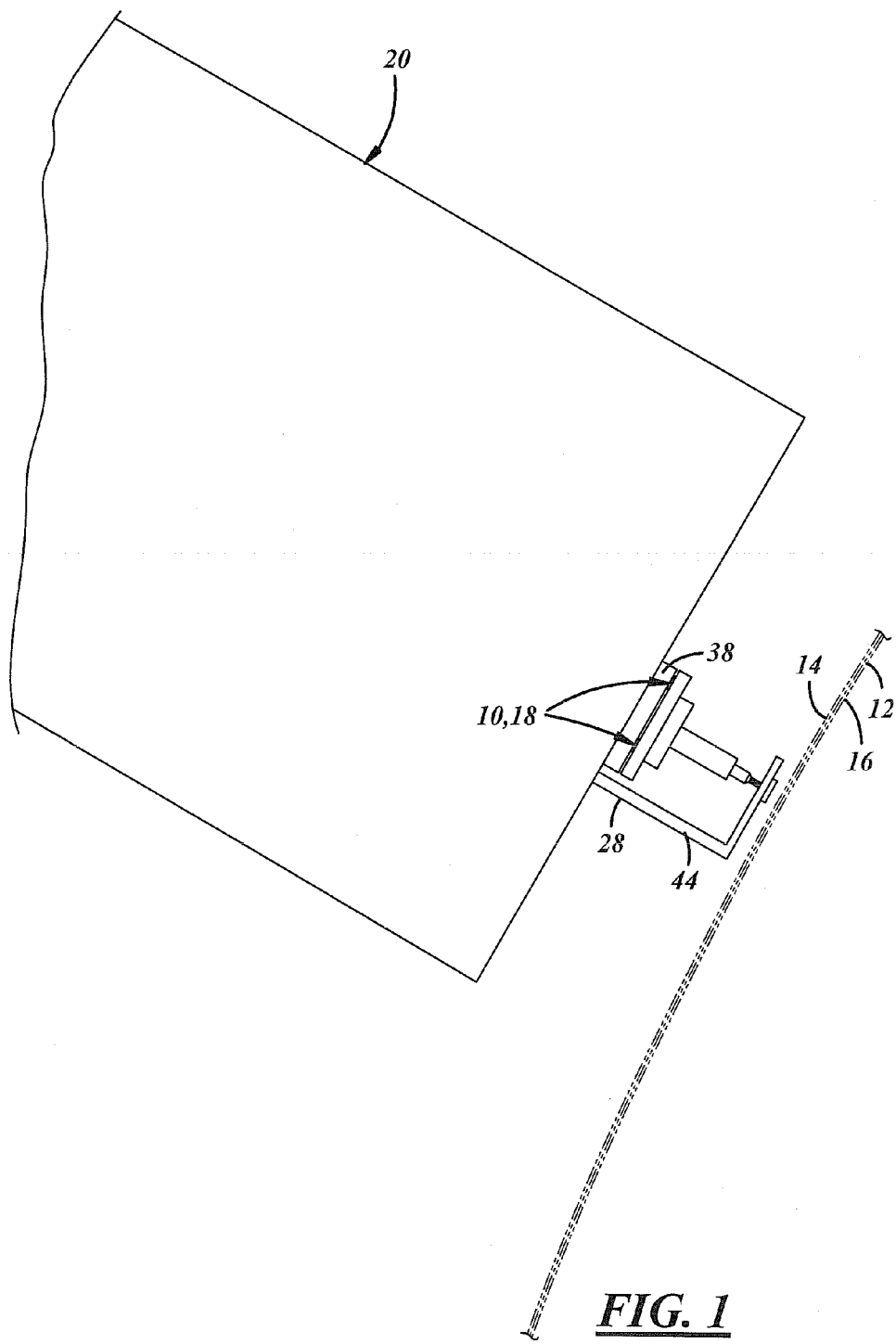
FIG. 1 is schematic rear perspective view of an autodrill including a through-hole depth measurement device with a pressure foot of the autodrill shown in a position adjacent a stack of two workpieces.
Figures 2, 3:
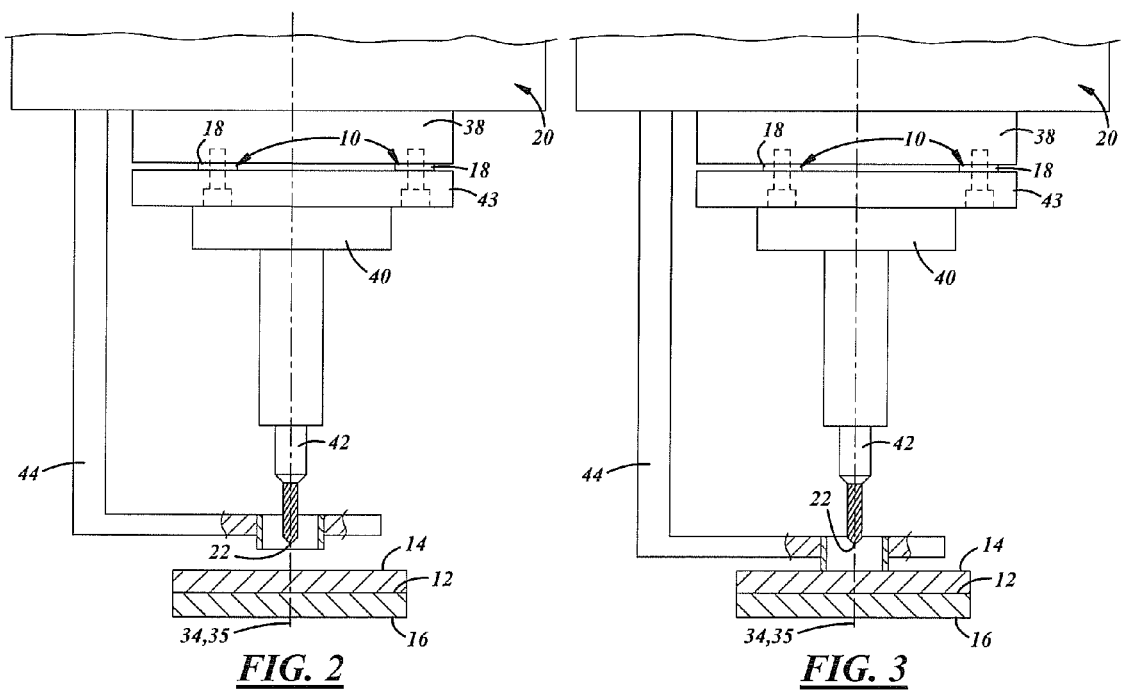
FIG. 2 is a schematic partial cross-sectional front view of the autodrill and workpiece stack of FIG. 1 with the pressure foot and a drill bit of the autodrill shown spaced from a near-side surface of the workpiece stack.
FIG. 3 is a schematic partial cross-sectional front view of the autodrill and workpiece stack of FIG. 1 with the pressure foot shown engaged against the near-side surface of the workpiece stack and the drill bit shown spaced from the near-side surface.
Figure 6:
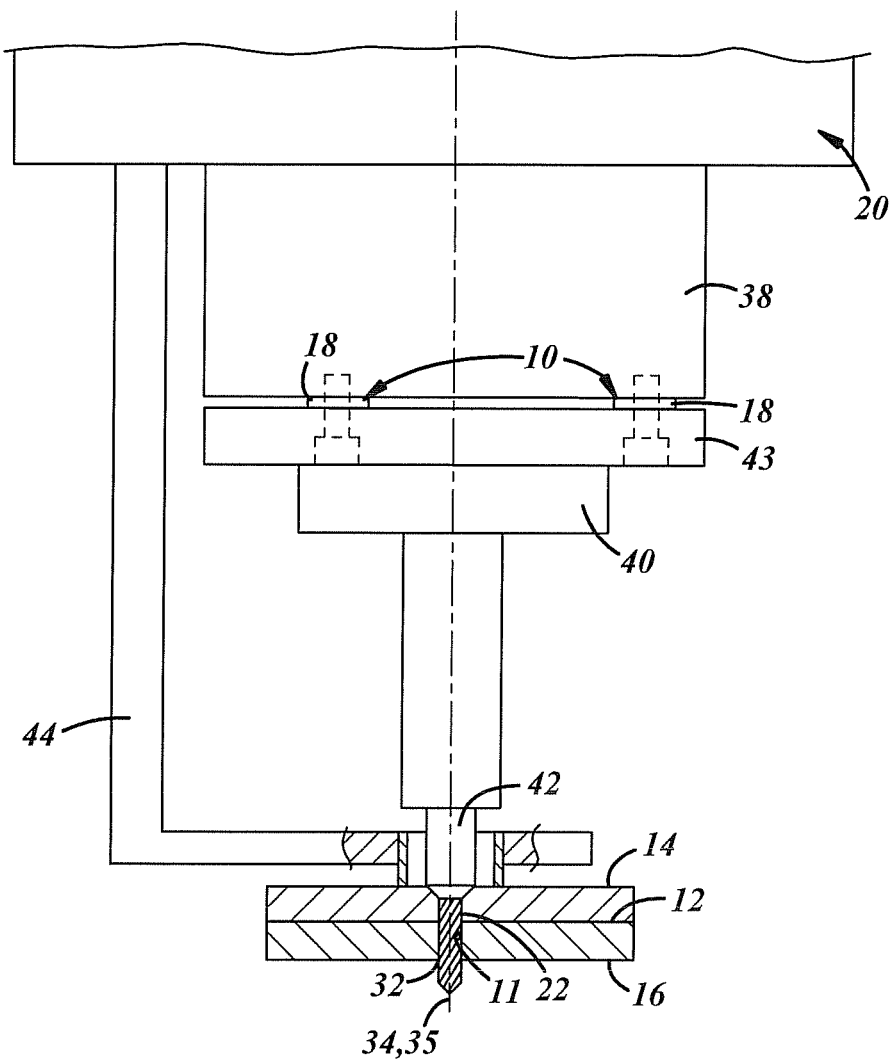
FIG. 6 is a schematic partial cross-sectional front view of the autodrill and workpiece stack of FIG. 1 with the pressure foot shown engaged against the near-side surface of the workpiece stack and the drill bit shown in a position having broken-through the far-side surface of the workpiece stack.

A device for measuring the depth of a through-hole 11 formed through one or more workpieces 12 is generally shown at 10 in the Figures. The device 10 may include cutting force sensors, shown at 18 in FIGS. 2-7, configured and mountable in respective positions to sense cutting force exerted by a drill bit 22 of a drill (e.g., an autodrill or numerical control (NC) machine), as is generally indicated at 20, against a workpiece or stack of workpieces 12. The device 10 may also include a controller, shown at 24 in FIG. 8, that's coupled to the force sensors 18 and is coupleable to a workpiece surface position sensor system, such as the system generally indicated at 26 in FIG. 8. The controller 24 may be configured to record the through-hole depth of a workpiece or stack of workpieces 12 (e.g., panels in a panel stack) in response to signals received from the workpiece surface position sensor system 26 when the drill bit 22 of the drill 20 reaches a drill bit exit point 32 along a spindle feed axis 34. The drill bit exit point 32 is the point (as best shown in FIGS. 5 and 6) where the drill bit 22 exits a far-side surface 16 of a workpiece or stack of workpieces 12.

Figure 8:
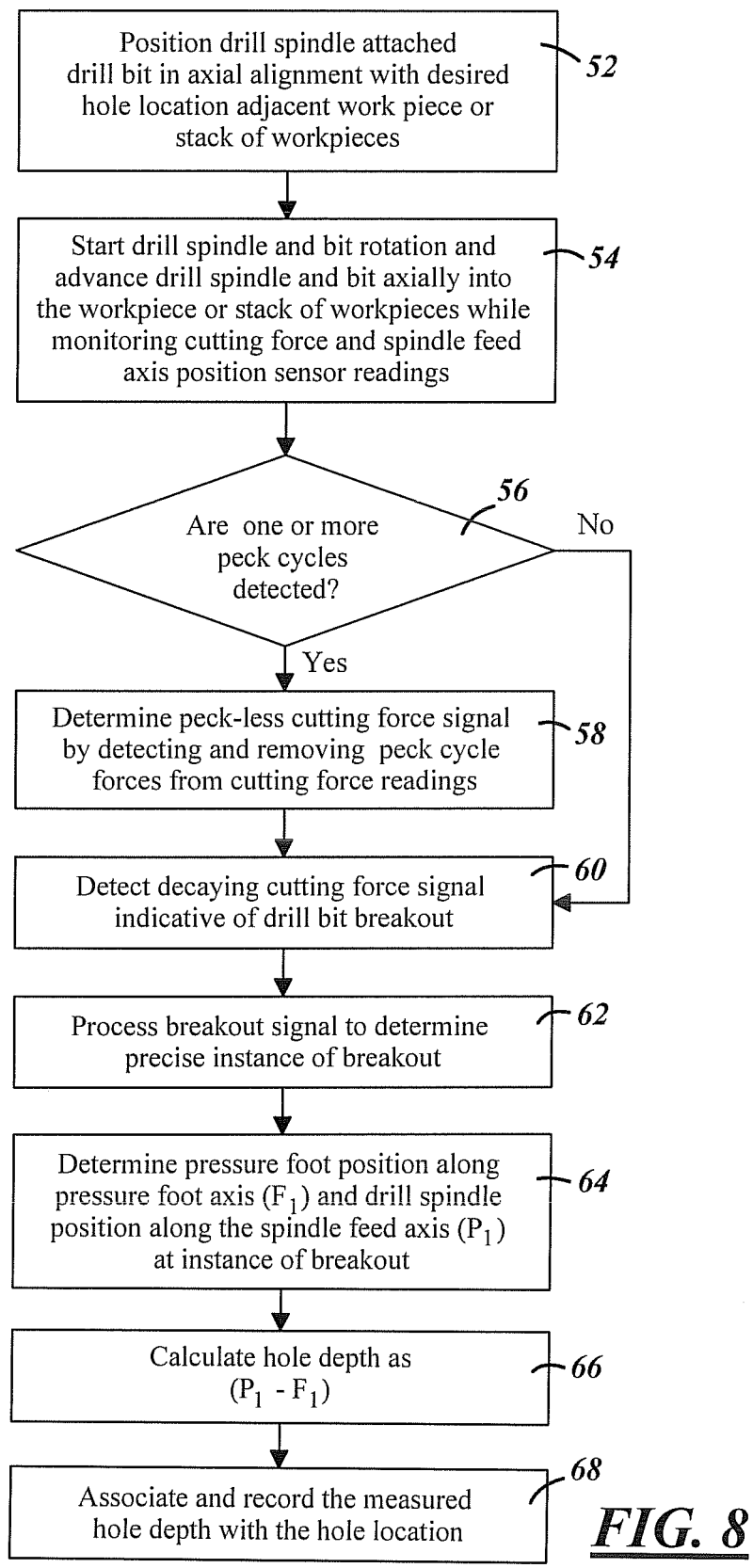
FIG. 8 is a flow chart showing a process of measuring the depth of a through-hole formed through one or more workpieces.

As best shown in FIG. 8, the cutting force sensors 18 may be configured and positionable to sense cutting force transmitted between a drill spindle 36 and a spindle housing 38 of the drill 20. The drill bit 22 may be removably fixed to the spindle 36 by a drill chuck 42. The drill spindle 36 may be supported with the drill bit 22 on the spindle housing 38 for rotation relative to the spindle housing 38 and for reciprocal axial motion with the spindle housing 38 along the spindle feed axis 34 of the drill spindle 36. Axial cutting force may be transmitted between the spindle 36 and spindle housing 38 along the spindle feed axis 34 via a flange 40 that's carried by the spindle housing 38 and that axially engages the spindle 36.

The cutting force sensors 18 may be configured and positioned to sense the cutting force that is transmitted axially between the drill spindle 36 and the spindle housing 38. The cutting force sensors 18 may be advantageously positioned in direct axial alignment with the direction of drill force application so that the sensors 18 can sense axial cutting force exerted by a drill bit 22 of a drill 20 against a workpiece 12. As best shown in FIG. 8, the cutting force sensors 18 may comprise a plurality (3) of axial cutting force sensor units that are configured and mountable in respective spaced-apart positions between the spindle housing 38 and a flange engagement plate 43 that's carried by the spindle housing 38 and that's connected to and cooperates with the flange 40 to transmit axial cutting force between the spindle 36 and the spindle housing 38.

The controller 24 may be configured to record through-hole depth as being the difference between a workpiece near-side surface 14 position indicated by the workpiece surface position sensor system 26 and a workpiece far-side surface 16 position indicated by the workpiece surface position sensor system 26 when the controller 24 receives a decaying force signal from the force sensors 18 indicative of drill bit breakout. Drill bit breakout may be defined as the emergence of a tip of the drill bit 22 from the far-side surface 16 of the workpiece or stack of workpieces 12.

Figure 7:
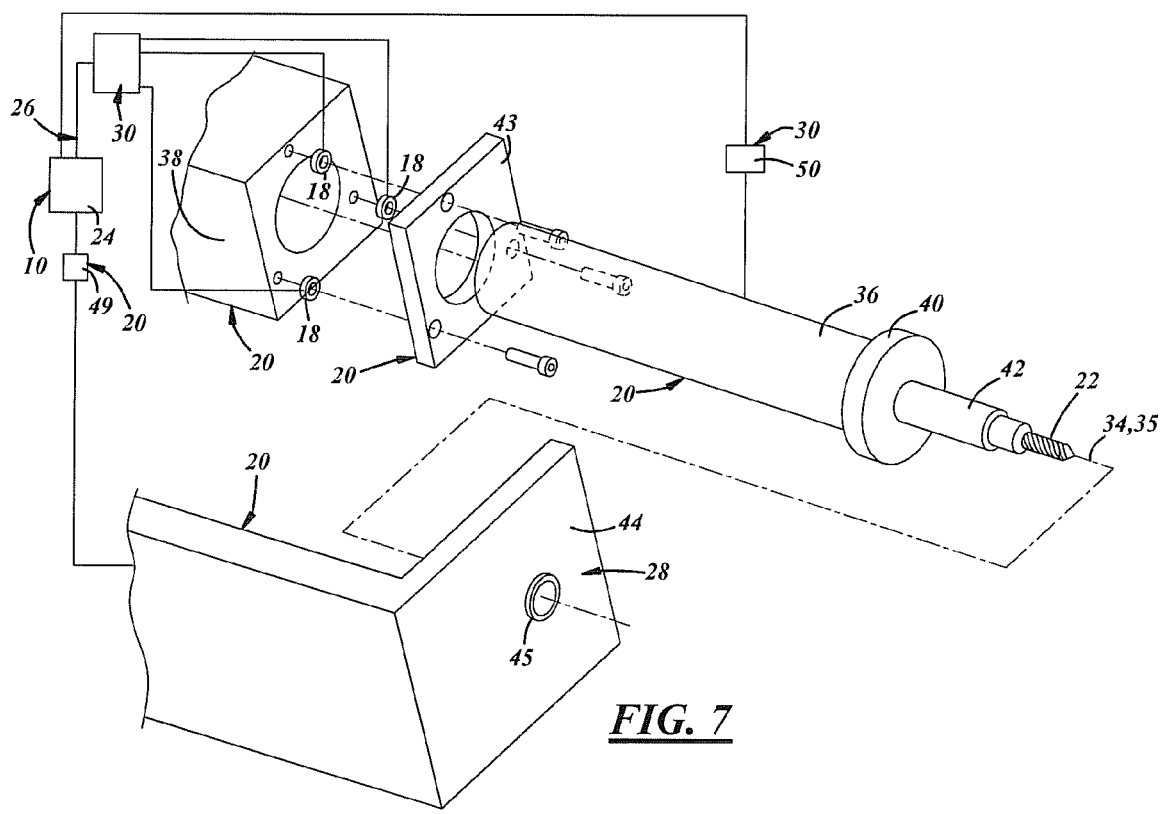
FIG. 7 is a schematic partial orthogonal exploded view of the autodrill and depth measurement device of FIG. 1.

As shown in FIG. 7, the workpiece surface position sensor system 26 may include a workpiece near-side surface position sensor 28 and a workpiece far-side surface position sensor 30. The far-side surface position sensor 30 may include the cutting force sensors 18. The controller 24 may be configured to record through-hole depth as being the difference between a workpiece near-side surface position indicated by the near-side position sensor 28 and a workpiece far-side surface position indicated by the far-side position sensor 30. The controller 24 may receive far-side surface position information from the far-side surface position sensor 30 in the form of a decaying force signal that's received from the force sensors 18 and is indicative of drill bit breakout.

The NC machine 20 may include a pressure foot 44 supported for reciprocal motion along a pressure foot axis 35 that may be parallel to the reciprocal motion of the drill bit 22 and spindle 36 along the spindle feed axis 34. As best shown in FIG. 7, the pressure foot axis 35 and the spindle feed axis 34 may be coaxially disposed.

As best shown in FIG. 7, the workpiece near-side surface position sensor 28 may comprise the pressure foot 44 a pressure foot axis position sensor 49 (e.g., a pressure foot axis encoder of an NC machine or autodrill 20), which may be configured to send the controller 24 a signal indicating the position of an outboard surface 45 of the pressure foot 44 when the pressure foot 44 is resting against the workpiece near-side surface 14. The workpiece far-side surface position sensor 30 may comprise a spindle feed axis position sensor (e.g., a spindle feed axis encoder of an NC machine or autodrill 20) configured to send the controller 24 signals indicating the position of the spindle along the spindle feed axis 34. The controller 24 may be configured to record through-hole depth as being the difference between a workpiece near-side surface position indicated by the pressure foot axis position sensor 49, and a workpiece far-side surface 16 position indicated by the spindle feed axis position sensor 30 when the controller 24 receives a decaying force signal from the force sensor 18 indicative of drill bit breakout. The device 10 may be used with a drill having no pressure foot, with the controller 24 being configured to determine workpiece near-side surface position by recognizing the sudden increase in force sensed by the force sensor 18 when the drill bit engages the near-side surface. However, an advantage of instead relying on pressure foot position reading to establish near-side surface position is that it neglects any deformation of the workpiece that might result from axially-directed pressure applied by the drill bit.

The controller 24 may be configured to determine the point in time and/or space at which the distal end of the drill bit 22 has actually breached a far side of a workpiece or stack of workpieces 12. The controller 24 may be configured to make this determination when a gradual and nonlinear reduction in force is experienced as the drill bit 22 exits the far-side surface 16 of the workpiece or stack of workpieces 12.

The controller 24 may be configured to distinguish between decaying force signals associated with drill bit breakout, and decaying force signals associated with peck cycles, i.e., drilling and pulling back cycles of an autodrill 20 when the autodrill is being operated in a "pecking" fashion. An autodrill 20 is operated in a pecking fashion to intermittently remove accumulated metal chips while drilling through a workpiece or stack of workpieces 12. The chips are removed to prevent the chips from interacting with the drill bit 22 of the autodrill 20 in a way that causes excessive wear to an inner circumferential surface of the hole being drilled). The controller 24 may also be configured to determine peckless cutting force signals by identifying and removing peck cycle forces from cutting force readings.

In practice, the depth of a through-hole 11 formed through one or more workpieces 12 can be measured by first actuating a drill 20 such as an autodrill or NC machine to position its drill spindle 36 and attached drill bit 22 in axial alignment with a desired hole location adjacent the workpiece or stack of workpieces 12 as shown in action step 52 of FIG. 8. The drill 20 may then be actuated, as shown in action step 54, to rotate and advance its drill spindle 36 axially, causing its drill bit 22 to cut into the workpiece or stack of workpieces 12 while the controller 24 is monitoring cutting force and workpiece surface position sensor 28, 30 readings. If, as shown in decision step 56, the controller 24 detects one or more peck cycles as the drill is cutting through the workpieces 12, the controller 24 may calculate or otherwise determine a peckless cutting force signal, as shown in action step 58, by detecting and removing peck cycle forces from cutting force readings.

As indicated in action step 60, the controller 24 may determine that the drill bit 22 has reached the far-side surface 16 of the workpiece or workpieces 12 by detecting a decaying cutting force signal indicative of drill bit 22 breakout. The controller 24 may then determine the precise instance of breakout by processing the breakout signal as shown in action step 62. The processing of the breakout signal may include, for example, comparing a decay profile of the cutting force signal to known decay profiles associated with drill bit breakout, and identifying the point in time within the sensed decay profile where breakout has been demonstrated to have occurred.

Once the precise point of drill bit breakout has been determined, the controller 24 may then poll or review readings taken from the pressure foot axis position sensor 49 and the spindle feed axis 34 position sensor 30 at the instance of breakout to determine workpiece near-side surface 14 position from the recorded pressure foot position along pressure foot axis 35 and to determine workpiece far-side position from the recorded drill spindle 36 position along the spindle feed axis 34 as shown in action step 64.

As indicated in action step 66, the controller 24 may then calculate hole depth as being the axial distance between workpiece near-side surface position and workpiece far-side surface position.

Where the drill 20 is an NC machine, the controller 24 may also poll the NC machine for coordinates identifying hole location in the workpiece 12 or workpiece stack. As shown in action step 68, the controller may associate and record the measured hole depth with the location of the measured hole 11.

A through-hole depth measurement device constructed as described above is able to measure the depth of a hole as it's cut by a drill, by sensing changes in drill force. By calculating hole depth based on drill bit position at point of drill bit breakout, such a device is able to record an accurate hole depth measurement despite workpiece deformation or displacement that may occur during the drilling process.

This description, rather than describing limitations of an invention, only illustrates an embodiment of the invention recited in the claims. The language of this description is therefore exclusively descriptive and is non-limiting. Obviously, it's possible to modify this invention from what the description teaches. Within the scope of the claims, one may practice the invention other than as described above.

What is claimed is:

1. A device for measuring the depth of a through-hole formed through one or more workpieces, the device comprising:
   a cutting force sensor configured and mountable in a position to sense cutting force exerted by a drill bit of a drill against a workpiece or stack of workpieces;
   a workpiece near-side surface position sensor comprising a pressure foot supported for reciprocal motion along a pressure foot axis, and further comprising a pressure foot axis position sensor configured to sense the position of the pressure foot along the pressure foot axis;
   a workpiece far-side surface position sensor; and
   a controller coupled to the cutting force sensor, coupleable to the pressure foot axis position sensor and the far-side position sensor, and configured to record a through-hole depth of a workpiece or stack of workpieces as being the difference between a workpiece near-side surface position indicated by the pressure foot axis position sensor and a workpiece far-side surface position indicated by the far-side position sensor when the controller receives a decaying force signal from the force sensor indicative of drill bit breakout.

2. A through-hole depth measurement device as defined in claim 1 in which the cutting force sensor is configured to sense axial cutting force transmitted between the drill spindle and the spindle housing.

3. A through-hole depth measurement device as defined in claim 2 in which the cutting force sensor is positioned in direct axial alignment with the direction of drill force application.

4. A through-hole depth measurement device as defined in claim 3 in which the cutting force sensor includes a plurality of axial cutting force sensor units configured and mountable in respective spaced-apart positions between the spindle housing and a flange engagement plate that transmits axial cutting force from the spindle to the spindle housing.

5. A through-hole depth measurement device as defined in claim 1 in which the workpiece near-side surface position sensor comprises a pressure foot axis position sensor, the far-side surface position sensor comprises a spindle feed axis position sensor, and the controller is configured to record through-hole depth as being the difference between a workpiece near-side surface position indicated by the pressure foot axis position sensor and a workpiece far-side surface position indicated by the spindle feed axis position sensor when the controller receives a decaying force signal from the force sensor indicative of drill bit breakout.

6. A through-hole depth measurement device as defined in claim 1 in which the controller is configured to determine, during a gradual and nonlinear reduction in force experienced as the drill bit exits the far-side surface of the workpiece or stack of workpieces, the point at which a distal end of the drill bit has actually breached a far side of the workpiece or stack of workpieces.

7. A through-hole depth measurement device as defined in claim 6 in which the controller is configured to distinguish between decaying force signals associated with drill bit breakout and decaying force signals associated with peck cycles by comparing received force signals to known profiles of force signals associated with drill bit breakout.

8. A through-hole depth measurement device as defined in claim 7 in which the controller is configured to determine peckless cutting force signals by identifying and removing peck cycle forces from cutting force readings.

9. A method for measuring the depth of a through-hole formed through one or more workpieces, the method including the steps of:
   positioning a drill spindle with an attached drill bit into axial alignment with a desired hole location adjacent a workpiece or stack of workpieces;
   rotating and advancing the drill spindle axially causing the bit to cut into the workpiece or stack of workpieces,
   monitoring cutting force and workpiece surface position sensor readings as the drill bit is cutting through the workpiece or stack of workpieces;
   detecting a decay in cutting force indicative of drill bit breakout;
   determining workpiece near-side surface position from the position of a pressure foot along a pressure foot axis; and
   determining workpiece far-side position by polling pressure foot axis and workpiece far-side surface position sensor readings at instance of breakout; and
   calculating hole depth as being the axial distance between workpiece near-side surface position and workpiece far-side surface position.

10. The method of claim 9 including the additional step of associating and recording the measured hole depth with the hole location.

11. The method of claim 9 in which the step of detecting a decay in cutting force indicative of drill bit breakout includes processing the breakout signal to determine precise instance of breakout.

12. The method of claim 9 in which the step of detecting a decay in cutting force indicative of drill bit breakout includes determining a peckless cutting force signal by detecting and removing peck cycle forces from cutting force readings.

13. The method of claim 9 in which the step of determining workpiece near-side surface position and workpiece far-side position includes determining workpiece near-side surface position from pressure foot position along pressure foot axis and determining workpiece far-side position from drill spindle position along the spindle feed axis by polling pressure foot axis and spindle feed axis position sensor readings at instance of breakout.

14. A drilling device comprising:
   a spindle housing;
   a drill spindle carried by the spindle housing;
   a drill bit carried by the drill spindle;
   at least one workpiece near-side surface position sensor comprising a pressure foot supported for reciprocal motion along a pressure foot axis, and further comprising a pressure foot axis position sensor configured to sense the position of the pressure foot along the pressure foot axis;
   at least one workpiece far-side position sensor comprising at least one cutting force sensor disposed axially between the spindle and the spindle housing; and
   a controller coupled to the workpiece near-side surface position sensor and the workpiece far-side position sensor and configured to record a through-hole depth of a workpiece or stack of workpieces in response to signals received from the workpiece near-side surface position sensor and from the workpiece far-side position sensor when the drill bit reaches a drill bit exit point.

* * * * *